United States Patent
Choi et al.

(10) Patent No.: US 11,965,471 B2
(45) Date of Patent: Apr. 23, 2024

(54) DEVICE AND METHOD FOR CONTROLLING VEHICLE BASED ON PASSAGE OF BUMP OF ROAD

(71) Applicant: HYUNDAI MOBIS CO., LTD., Seoul (KR)

(72) Inventors: Yung Sik Choi, Bucheon-si (KR); Kyoung Jun Yoon, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/994,443

(22) Filed: Nov. 28, 2022

(65) Prior Publication Data
US 2023/0323828 A1   Oct. 12, 2023

(30) Foreign Application Priority Data
Mar. 24, 2022   (KR) ........................ 10-2022-0036919

(51) Int. Cl.
*F02D 41/02*   (2006.01)
*B60K 31/00*   (2006.01)

(52) U.S. Cl.
CPC ............ *F02D 41/021* (2013.01); *B60K 31/00* (2013.01); *B60Y 2300/02* (2013.01); *B60Y 2300/24* (2013.01); *B60Y 2300/43* (2013.01); *F02D 2200/501* (2013.01); *F02D 2200/702* (2013.01)

(58) Field of Classification Search
CPC ............ F02D 41/021; F02D 2200/501; F02D 2200/702; B60K 31/00; B60Y 2300/02; B60Y 2300/24; B60Y 2300/43
See application file for complete search history.

(56) References Cited

U.S. PATENT DOCUMENTS

| | | | | |
|---|---|---|---|---|
| 5,281,009 | A | * | 1/1994 | Kidston .............. B60T 8/17636 303/162 |
| 5,404,302 | A | * | 4/1995 | Matsuda ................ B60T 8/175 303/169 |
| 5,566,090 | A | * | 10/1996 | Angermaier .......... G01P 15/165 180/197 |
| 2013/0030674 | A1 | * | 1/2013 | Minase ................ F02D 41/021 701/110 |
| 2019/0232748 | A1 | * | 8/2019 | Mohamed .......... B60G 17/0165 |
| 2020/0346654 | A1 | * | 11/2020 | Kojo ................ G08G 1/096888 |
| 2021/0188228 | A1 | * | 6/2021 | Lee ......................... B60T 8/171 |
| 2022/0268224 | A1 | * | 8/2022 | Marconi ................ B60L 15/20 |

* cited by examiner

*Primary Examiner* — Carl C Staubach
(74) *Attorney, Agent, or Firm* — NovoTechIP International PLLC

(57) ABSTRACT

A method and apparatus for controlling a vehicle are disclosed. The method comprises acquiring an acceleration of a front wheel and a rear wheel, determining that the front wheel is passing a bump of a road in response to determining that the acceleration of the front wheel is outside an acceleration range and fluctuates in the range wider than the acceleration range within a first maximum time period, determining that the rear wheel is passing the bump in response to determining that the acceleration of the rear wheel is outside the acceleration range and fluctuates in the range wider than the acceleration range within a second maximum time period, and in response to determining that the front wheel has passed the bump and the rear wheel is passing the bump, controlling a drive unit of the vehicle.

18 Claims, 14 Drawing Sheets

DEVICE AND METHOD FOR CONTROLLING VEHICLE BASED ON PASSAGE OF BUMP OF ROAD

CROSS-REFERENCE TO RELATED APPLICATIONS

The present application is based on and claims the benefit of priority to Korean Patent Application Number 10-2022-0036919, filed on Mar. 24, 2022 in the Korean Intellectual Property Office, the entire disclosure of which is incorporated herein by reference.

TECHNICAL FIELD

The present disclosure relates to a method and apparatus for controlling a vehicle based on passing a bump of a road, in particular a method and apparatus for controlling a drive unit of a vehicle based on the vehicle passing a bump of a road.

BACKGROUND

The content described below merely provides background information related to the present embodiment and does not constitute the prior art.

A traction control system (TCS) of a vehicle is an active safety device that improves acceleration performance and steering stability of the vehicle by preventing excessive wheel slip when the vehicle starts or accelerates on a road surface with low friction or a road surface with different characteristics for each tire location.

The traction control system detects a slip of the wheel of the vehicle and reduces the slip of the wheel by controlling output of an engine or motor or controlling a brake pressure. Specifically, when a speed of the wheel increases or a slip ratio increases, the traction control system calculates a target wheel speed at which an optimal driving force can be obtained, and reduces a torque of the engine or motor or reduces the speed of the wheel so that the wheel speed of the vehicle follows the target wheel speed. Alternatively, the traction control system may reduce the brake pressure applied to each of a plurality of wheels.

The traction control system operates when an operation condition is satisfied based on at least one of the slip ratio of the vehicle, a speed of the vehicle, and speeds of one or more wheels. Here, the slip ratio is a value obtained by dividing a difference between the speed of the vehicle and the wheel speed by the vehicle speed. When the vehicle travels in a state where the rotation of the wheel is stopped, a braking slip ratio is high. As an operation condition of the traction control system, the traction control system may operate when the slip ratio or wheel speed of the vehicle becomes higher than a preset threshold value. The traction control system controls the engine, motor or brake pressure to reduce the slip ratio or wheel speed.

However, the traction control system may also be operated in unnecessary situations.

Specifically, a surface of a bump, such as a speed bump of a road, does not have a small amount of friction and does not have different characteristics for each location. In other words, the control of the traction control system is not required when the vehicle passes the bump of the road.

However, when the vehicle passes the bump, an impact may increase the slip ratios of one or more wheels or increase the speed of the wheels. Therefore, the traction control system may be operated even though the traction control is not required when the vehicle passes the bump.

When the traction control system operates on the bump, the vehicle may not accelerate smoothly immediately after the vehicle passes the bump. That is, acceleration performance or starting performance of the vehicle may deteriorate.

Therefore, there is a need for research on a method for preventing the acceleration performance or starting performance of the vehicle from being deteriorated by the traction control system of the vehicle on the bump of the road.

SUMMARY

According to at least one embodiment, the present disclosure provides a method of operating a vehicle control device. The method comprises acquiring an acceleration of a front wheel of a vehicle; determining (1) whether the acceleration of the front wheel is outside an acceleration range and (2) whether the acceleration of the front wheel fluctuates in a range wider than the acceleration range within a first maximum time period starting from a time at which the acceleration of the front wheel departs from the acceleration range; determining that the front wheel is passing a bump of a road in response to determining that (1) the acceleration of the front wheel is outside the acceleration range and (2) the acceleration of the front wheel fluctuates in the range wider than the acceleration range within the first maximum time period; acquiring an acceleration of a rear wheel of the vehicle; determining (1) whether the acceleration of the rear wheel is outside the acceleration range and (2) whether the acceleration of the rear wheel fluctuates in a range wider than the acceleration range within a second maximum time period starting from a time at which the acceleration of the rear wheel departs from the acceleration range; determining that the rear wheel is passing the bump in response to determining that (1) the acceleration of the rear wheel is outside the acceleration range and (2) the acceleration of the rear wheel fluctuates in the range wider than the acceleration range within the second maximum time period; and in response to determining that the front wheel has passed the bump and the rear wheel is passing the bump, controlling a drive unit of the vehicle to control a power source of the vehicle.

According to another embodiment of the present disclosure, a vehicle control device is provided, the vehicle control device comprising: an acquirement unit configured to acquire an acceleration of a front wheel and an acceleration of a rear wheel; a determination unit configured to determine that the front wheel is passing a bump of a road when the acceleration of the front wheel is outside a preset acceleration range and the acceleration of the front wheel fluctuates in a range wider than the acceleration range within a preset maximum time period starting from a time when the acceleration of the front wheel is out of the acceleration range and determine that the rear wheel is passing the bump when the acceleration of the rear wheel is outside the acceleration range and the acceleration of the rear wheel fluctuates in a range wider than the acceleration range within a preset maximum time period starting from a time when the acceleration of the rear wheel is out of the acceleration range; and a control unit configured to control a drive unit of a vehicle based on a determination result of the determination unit. According to another embodiment, the present disclosure provides a device for controlling a vehicle. The device comprises an acquirement unit configured to acquire accelerations of front and rear wheels of the vehicle; a determination unit configured to determine whether (1) the acceleration of the front wheel is outside an acceleration range and (2) the acceleration of the front wheel fluctuates in a range wider than the acceleration range within a first maximum time period starting from a time at which the acceleration of the front wheel departs from the acceleration range; determine that the front wheel is passing a bump of a road in response to determining that (1) the acceleration of the front wheel is outside the acceleration range and (2) the acceleration of the front wheel fluctuates in the range wider than the acceleration range within the first maximum time period; and determine whether (1) the acceleration of the rear wheel is outside the acceleration range and (2) the acceleration of the rear wheel fluctuates in a range wider than the acceleration range within a second maximum time period starting from a time at which the acceleration of the rear wheel departs from the acceleration range; and determine that the rear wheel is passing the bump in response to determining that (1) the acceleration of the rear wheel is outside the acceleration range and (2) the acceleration of the rear wheel fluctuates in the range wider than the acceleration range within the second maximum time period; and a control unit configured to control, in response to the determination unit determining that the front wheel has passed the bump and the rear wheel is passing the bump, a drive unit of the vehicle to control a power source of the vehicle.

DETAILED DESCRIPTION

Figure 1:
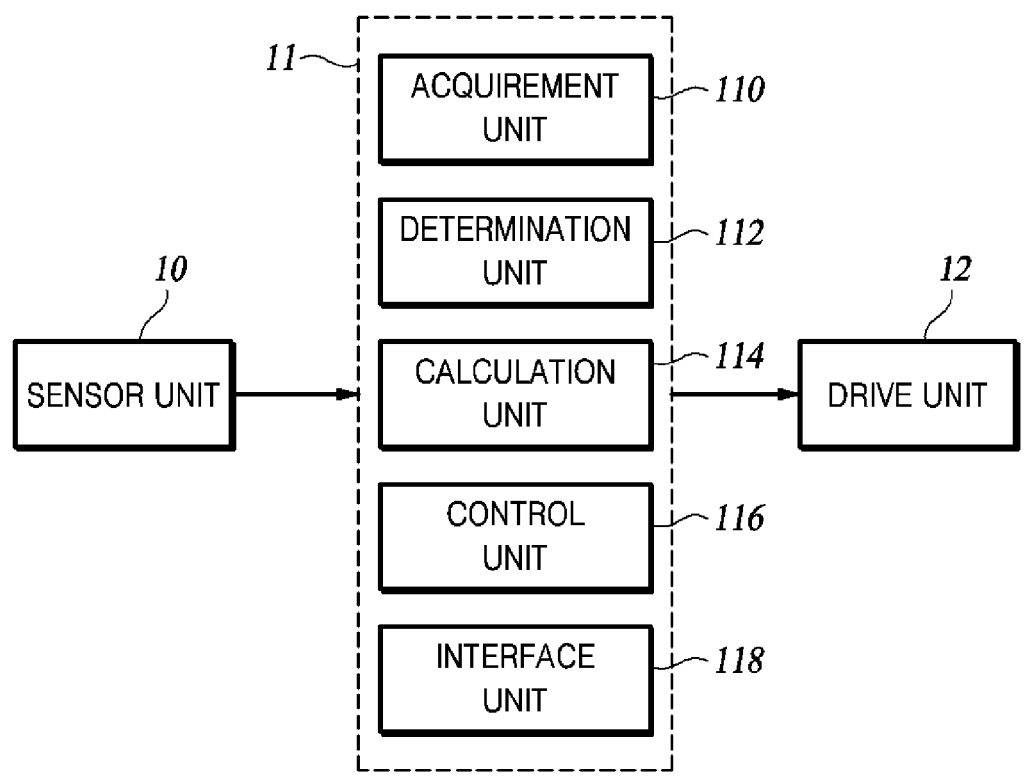
FIG. 1 is a configuration diagram of a vehicle control system according to one embodiment of the present disclosure.

According to the method and apparatus according to one embodiment, it is possible to prevent acceleration perfor- mance or starting performance of the vehicle from being deteriorated by the traction control system when the vehicle travels a bump of a road.

The aspects of the present disclosure are not limited to the foregoing, and other problems not mentioned herein will be able to be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

FIG. 1 is a configuration diagram of a vehicle control system according to one embodiment of the present disclosure.

Referring to FIG. 1, the vehicle control system includes a sensor unit 10, a control device 11, and a drive unit 12. The control device 11 includes an acquirement unit 110 and a determination unit 112. The control device 11 may further include at least one of a calculation unit 114, a control unit 116, and an interface unit 118. Meanwhile, the sensor unit 10, the control device 11, and the drive unit 12 may be implemented as one device.

The sensor unit 10 collects vehicle information using various sensors.

The sensor unit 10 may include at least one of a speed sensor for measuring a speed of a vehicle, a wheel speed sensor for measuring a rotational speed or an angular speed of a wheel of the vehicle, and a wheel acceleration sensor for measuring the acceleration of the wheel of the vehicle.

The sensor unit 10 may acquire the acceleration of the wheel by using at least one of the wheel speed sensor and the wheel acceleration sensor. Here, the acceleration of the wheel refers to tangential acceleration of the wheel. For example, the acceleration of the wheel may either be a tangential acceleration at a contact point between a tire surrounding the wheel and a flat road surface, or the tangential acceleration of the wheel. Alternatively, the acceleration of the wheel may be an angular acceleration of the wheel.

The sensor unit 10 may acquire an acceleration of at least one front wheel and an acceleration of at least one rear wheel.

According to one embodiment of the present disclosure, the acceleration of one front wheel and the acceleration of one rear wheel are used.

The sensor unit 10 may acquire the speed of the wheel by using the wheel speed sensor. Here, the speed of the wheel refers to either a tangential speed or a tangential acceleration of the wheel at the contact point between the tire and the road surface. For example, the sensor unit 10 may obtain the speed of the wheel by multiplying the rotational speed of the wheel by a radius.

The sensor unit 10 may further include a heading sensor, a yaw sensor, a gyro sensor, a vehicle forward/rearward sensor, a vehicle body inclination sensor, a tire sensor, a steering sensor for steering wheel rotation, or the like.

The drive unit 12 controls at least one of an engine and a motor which are a power source of the vehicle.

The drive unit 12 operates according to a command from the control device 11. For example, when the control device 11 transmits a torque command to the drive unit 12, the drive unit 12 controls the output of the power source of the vehicle based on the torque command. Here, the output of the power source means a torque of the engine or a torque of the motor.

When the power source of the vehicle is an engine, the drive unit 12 may perform electronic control of the engine. The drive unit 12 may control the speed of the drive wheel or the speed of the vehicle by controlling the torque of the engine. Here, the drive wheel means a wheel connected to a main power shaft of the vehicle. For example, the drive wheel of a front wheel drive vehicle is one of the front wheels.

When the power source of the vehicle is a motor, the drive unit 12 may perform electronic control of the motor. The drive unit 12 may control the rotational speed of the motor, the speed of the drive wheel, or the speed of the vehicle by controlling the torque of the motor.

When the power source of the vehicle includes both the engine and the motor, the drive unit 12 may control both the engine and the motor.

Meanwhile, the traction control system operates while the vehicle passes the bump. In order to prevent the output of the power source of the vehicle from being reduced by the traction control system, the control device 11 controls the drive unit 12 of the vehicle.

To this end, the control device 11 determines whether the vehicle has passed the bump of the road and controls the vehicle. Specifically, the control device 11 determines whether the wheel of the vehicle passes the bump based on an acceleration of at least one wheel, and controls the output of the power source using the drive unit 12 of the vehicle.

Hereinafter, the control device 11 will be described in detail.

The acquirement unit 110 acquires the acceleration of the front wheel and the acceleration of the rear wheel of the vehicle.

The acquirement unit 110 may receive the rotational speed of the front wheel and the rotational speed of the rear wheel collected by the sensor unit 10, and based on the rotational speed and radius of the front wheel and the rotational speed and radius of the rear wheel, the acceleration of the front wheel and the acceleration of the rear wheel can be calculated. Otherwise, the acquirement unit 110 may acquire the acceleration of the front wheel and the acceleration of the rear wheel from the sensor unit 10.

The acquirement unit 110 may calculate the speed of the wheel based on the rotational speed and radius of the front wheel and the rotational speed and radius of the rear wheel. Otherwise, the acquirement unit 110 may acquire the speed of the front wheel and the speed of the rear wheel from the sensor unit 10.

The determination unit 112 determines the fluctuation of the acceleration of the front wheel and the fluctuation of the acceleration of the rear wheel, and determines whether the front wheel and the rear wheel are passing the bump of the road based on the determination result. The determination unit 112 determines that the front wheel is passing the bump of the road in response to determining that (1) the acceleration of the front wheel is outside the acceleration range and (2) the acceleration of the front wheel fluctuates in the range wider than the acceleration range within the first maximum time period starting from a time at which the acceleration of the front wheel departs from the acceleration range. The determination unit 112 determines that the rear wheel is passing the bump in response to determining that (1) the acceleration of the rear wheel is outside the acceleration range and (2) the acceleration of the rear wheel fluctuates in the range wider than the acceleration range within the second maximum time period starting from a time at which the acceleration of the rear wheel departs from the acceleration range.

Specifically, the determination unit 112 determines whether the acceleration of the front wheel is outside a preset acceleration range. In particular, the determination unit 112 may determine whether the acceleration of the front wheel is outside the acceleration range at the current time point. Here, the acceleration range is determined by an upper threshold value and a lower threshold value. As an example, the upper threshold value may be 20 m/s2, and the lower threshold value may be −20 m/s2. The two threshold values may be symmetric or asymmetric about 0 m/s2.

When the acceleration of the front wheel is outside the acceleration range, the determination unit 112 determines whether the acceleration of the front wheel fluctuates in a range wider than the acceleration range within a preset maximum time period starting from a time when the acceleration of the front wheel is out of or departs from the acceleration range. To this end, the determination unit 112 monitors the acceleration of the front wheel acquired starting from the time when the acceleration of the front wheel is out of the acceleration range.

Meanwhile, when the acceleration of the front wheel is within the acceleration range, the determination unit 112 determines whether the acceleration of the front wheel acquired after the time when it is determined that the acceleration of the front wheel is out of the acceleration range is outside the acceleration range.

In one embodiment, when the acceleration of the front wheel is outside the acceleration range, in a case where the acceleration of the front wheel within a maximum time period has a pattern of decreasing from above the upper threshold value to below the lower threshold value and then increasing from below the lower threshold value to above the upper threshold value, the determination unit 112 determines that the acceleration of the front wheel fluctuates in a range wider than the acceleration range. Additionally, in a case where the acceleration of the front wheel within the maximum time period has a pattern of increasing from below the lower threshold value to above the upper threshold value and then decreasing from above the upper threshold value to below the lower threshold value, the determination unit 112 determines that the acceleration of the front wheel fluctuates in a range wider than the acceleration range.

In another embodiment, the determination unit 112 may determine a fluctuation in the acceleration of the front wheel during a time period having a preset size.

Specifically, the determination unit 112 determines whether, the acceleration of the front wheel decreases from a value larger than the upper threshold value of the acceleration range to a value smaller than the lower threshold value or increases from a value smaller than the lower threshold value to a value larger than the upper threshold value during a first time period having a preset size.

In the present disclosure, the preset size may be a multiple of an operation period of the control device 11. For example, when the operation period of the control device 11 is 2 ms, the preset size may be 8 ms. In this case, the aforementioned maximum time period may be 16 ms, which is twice the preset size.

When the acceleration of the front wheel decreases from the value larger than the upper threshold value to the value smaller than the lower threshold value during the first time period, the determination unit 112 determines whether the acceleration of the front wheel increases from the value smaller than the lower threshold value to the value larger than the upper threshold value during a second time period. In other words, the determination unit 112 determines whether there is a second time period of a preset size including a time period in which the acceleration of the front wheel increases from the value smaller than the lower threshold value to the value larger than the upper threshold value.

The second time period is a time period having a preset size with a starting point within the first time period. The starting point of the second time period may be from immediately after the starting point of the first time period to an end point of the first time period.

When the acceleration of the front wheel decreases from the value larger than the upper threshold value to the value smaller than the lower threshold value during the first time period and increases from the value smaller than the lower threshold value to the value larger than the upper threshold value during the second time period, the determination unit 112 determines that the acceleration of the front wheel fluctuates in a range wider than the acceleration range within the maximum time period. Otherwise, the determination unit 112 determines whether the acceleration of the front wheel acquired after the time when it is determined that the acceleration of the front wheel deviates from the acceleration range is outside the acceleration range.

Meanwhile, when the acceleration of the front wheel increases from the value smaller than the lower threshold value to the value larger than the upper threshold value during the first time period, the determination unit 112 determines whether the acceleration of the front wheel decreases from the value larger than the upper threshold value to the value smaller than the lower threshold value during the second time period.

When the acceleration of the front wheel increases from the value smaller than the lower threshold value to the value larger than the upper threshold value during the first time period and decreases from the value larger than the upper threshold value to the value smaller than the lower threshold value during the second time period, the determination unit 112 determines that the acceleration of the front wheel fluctuates in a range wider than the acceleration range within the maximum time period. Otherwise, the determination unit 112 determines whether the acceleration of the front wheel acquired after the time when it is determined that the acceleration of the front wheel deviates from the acceleration range is outside the acceleration range.

Finally, when the acceleration of the front wheel fluctuates in a range wider than the acceleration range within the preset maximum time period starting from the time when the acceleration of the front wheel is out of the acceleration range, the determination unit 112 determines that the front wheel is passing the bump of the road.

Independently of the determination of the fluctuation in the acceleration of the front wheel, the determination unit 112 determines the fluctuation in the acceleration of the rear wheel. The determination process regarding the fluctuation in the acceleration of the rear wheel corresponds to the determination process regarding the fluctuation in the acceleration of the front wheel.

The determination unit 112 determines whether the acceleration of the rear wheel is outside the acceleration range.

When the acceleration of the rear wheel is outside the acceleration range, the determination unit 112 determines whether the acceleration of the rear wheel fluctuates in a range wider than the acceleration range within a preset maximum time period starting from a time when the acceleration of the rear wheel is out of the acceleration range.

Meanwhile, when the acceleration of the rear wheel is within the acceleration range, the determination unit 112 determines whether the acceleration of the rear wheel acquired after the time when it is determined that the acceleration of the rear wheel is out of the acceleration range is outside the acceleration range.

In one embodiment, when the acceleration of the rear wheel has a pattern of decreasing from above the upper threshold value to below the lower threshold value within the maximum time period and then increasing from below the lower threshold value to above the upper threshold value, the determination unit 112 can determine that the acceleration of the rear wheel fluctuates in the range wider than the acceleration range. In the opposite case, the same is determined.

In another embodiment, the determination unit 112 may determine the fluctuation in the acceleration of the rear wheel during a time period having a preset size.

Specifically, the determination unit 112 determines whether the acceleration of the rear wheel decreases from a value larger than the upper threshold value of the acceleration range to a value smaller than the lower threshold value or increases a value smaller than the lower threshold value to a value larger than the upper threshold value during a third time period having a preset size.

When the acceleration of the rear wheel decreases from the value larger than the upper threshold value to the value smaller than the lower threshold value during the third time period, the determination unit 112 determines whether the acceleration of the rear wheel increases from the value smaller than the lower threshold value to the value larger than the upper threshold value during a fourth time period.

The fourth time period is a time period having a preset size with a starting point within the third time period. The starting point of the fourth time period may be from immediately after the starting point of the third time period to an end point of the third time period.

When the acceleration of the rear wheel decreases from the value larger than the upper threshold value to the value smaller than the lower threshold value during the third time period and increases from the value smaller than the lower threshold value to the value larger than the upper threshold value during the fourth time period, the determination unit 112 determines that the acceleration of the rear wheel fluctuates in a range wider than the acceleration range within the maximum time period. Otherwise, the determination unit 112 determines whether the acceleration of the rear wheel acquired after the time when it is determined that the acceleration of the rear wheel is out of the acceleration range is outside the acceleration range.

Meanwhile, when the acceleration of the rear wheel increases from the value smaller than the lower threshold value to the value larger than the upper threshold value during the third time period, the determination unit 112 determines whether the acceleration of the rear wheel decreases from the value larger than the upper threshold value to the value smaller than the lower threshold value during the fourth time period.

When the acceleration of the rear wheel increases from the value smaller than the lower threshold value to the value larger than the upper threshold value during the third time period and decreases from the value larger than the upper threshold value to the value smaller than the lower threshold value during the fourth time period, the determination unit 112 determines that the acceleration of the rear wheel fluctuates in a range wider than the acceleration range within the maximum time period. Otherwise, the determination unit 112 determines whether the acceleration of the rear wheel acquired after the time when it is determined that the acceleration of the rear wheel deviates from the acceleration range is outside the acceleration range.

Finally, when the acceleration of the rear wheel fluctuates in the range wider than the acceleration range within the preset maximum time period from the time when the acceleration of the rear wheel deviates from the acceleration range, the determination unit 112 determines that the rear wheel is passing the bump of the road.

Through the above-described processes, the determination unit 112 may accurately determine whether the front wheel and the rear wheel are passing the bump based on the fluctuations in the accelerations of the front wheel and the rear wheel.

In another embodiment, the determination unit 112 may determine that the vehicle has crossed the bump when the time when it is determined that the rear wheel has passed the bump is within a predetermined time from the time when it is determined that the front wheel has passed the bump.

Specifically, the calculation unit 114 calculates a time limit based on a wheelbase and speed of the vehicle. The time limit is an estimation of a time from when the front wheel crosses the bump to a time when the rear wheel crosses the bump. That is, the time limit may be a value obtained by dividing the wheelbase of the vehicle by the speed.

The determination unit 112 determines whether the vehicle has crossed the bump of the road based on whether the time when it is determined that the acceleration of the rear wheel fluctuates in the range wider than the acceleration range is within the time limit from the time when it is determined that the acceleration of the front wheel fluctuates in the range wider than the acceleration range. That is, only when the time of determining the acceleration of the rear wheel is within the time limit, the determination unit 112 may determine that the vehicle has crossed the bump.

Meanwhile, while the determination unit 112 determines the fluctuation in the acceleration of the front wheel or the fluctuation in the acceleration of the rear wheel, the traction control system may operate. In general, when the front wheel is passing the bump, a slip ratio of the drive wheel increases, and the traction control system is operated. The traction control system reduces a torque of an engine or a torque of a motor. When the slip ratio of the drive wheel decreases to a certain value, the control of the traction control system is stopped. Due to this, although the vehicle travels on a road of which the surface is not slippery, acceleration performance or starting performance of the vehicle may be degraded.

The control unit 116 controls the drive unit 12 to prematurely stop the operation of the traction control system. In this case, the control unit 116 operates based on the determination result of the determination unit 112.

The control unit 116 controls the drive unit 12 to prevent the output of the power source from being reduced by the traction control system. That is, the control unit 116 controls the drive unit 12 so that output of the power source is higher than an output value required by the traction control system. This is because, on a non-slip road, the higher the output of the power source, the faster the slip ratio of the drive wheel can decrease. That is, the control unit 116 controls the drive unit 12 so that the output of the power source does not decrease, and thus, it is possible to prematurely stop the control of the traction control system.

In one embodiment, the control unit 116 may control the drive unit 12 based on output of the power source recorded at a time when the traction control system starts to operate. Specifically, the control unit 116 stores a torque of the power source when the traction control system starts to operate. Thereafter, when the determination unit 112 determines that the vehicle has crossed the bump, the control unit 116 controls the drive unit 12 based on a difference between the torque of the power source and a pre-stored torque value. As an example, the control unit 116 may control the drive unit 12 to reduce the difference between the torque of the power source and a pre-stored torque value. Meanwhile, the torque of the power source at the time of the previous operation of the traction control system may be used.

In one embodiment, the control unit 116 may control the drive unit 12 to control a power source of the vehicle, in response to determining that the front wheel has passed the bump and the rear wheel is passing the bump. Specifically, the calculation unit 114 calculates the time limit based on the wheelbase and speed of the vehicle. The time limit is an estimation of the time from when the front wheel crosses the bump to the time when the rear wheel crosses the bump. That is, the time limit may be a value obtained by dividing the wheelbase of the vehicle by the speed. The control unit 116 may control the drive unit 12 when the time when it is determined that the rear wheel passes the bump is within the time limit from the time when it is determined that the front wheel passes the bump. When it is not within the time limit, the control of the drive unit 12 of the control unit 116 is not performed. Accordingly, the control device 11 can control the vehicle by accurately determining whether the vehicle crosses the bump.

In one embodiment, the control unit 116 may control the drive unit 12 when the speed of the drive wheel of the vehicle is smaller than a value corresponding to the operation condition of the traction control system. In other words, when the tangential speed of the drive wheel is smaller than the speed value corresponding to the operation condition of the traction control system, the control unit 116 controls the drive unit 12, and when it is larger than the corresponding speed value, the drive unit 12 is not controlled. This is because the operation of the traction control system is required when the surface of the bump is slippery. The control unit 116 may improve the starting or accelerating performance of the vehicle by distinguishing the slippery bump from the non-slip bump.

In one embodiment, the control unit 116 may control the drive unit 12 only when a control authority for the drive unit 12 is granted. Specifically, the interface unit 118 is a user interface, and receives the control authority from an occupant. The control unit 116 controls the drive unit 12 based on the control authority. This provides user convenience to the user.

Figure 2A:
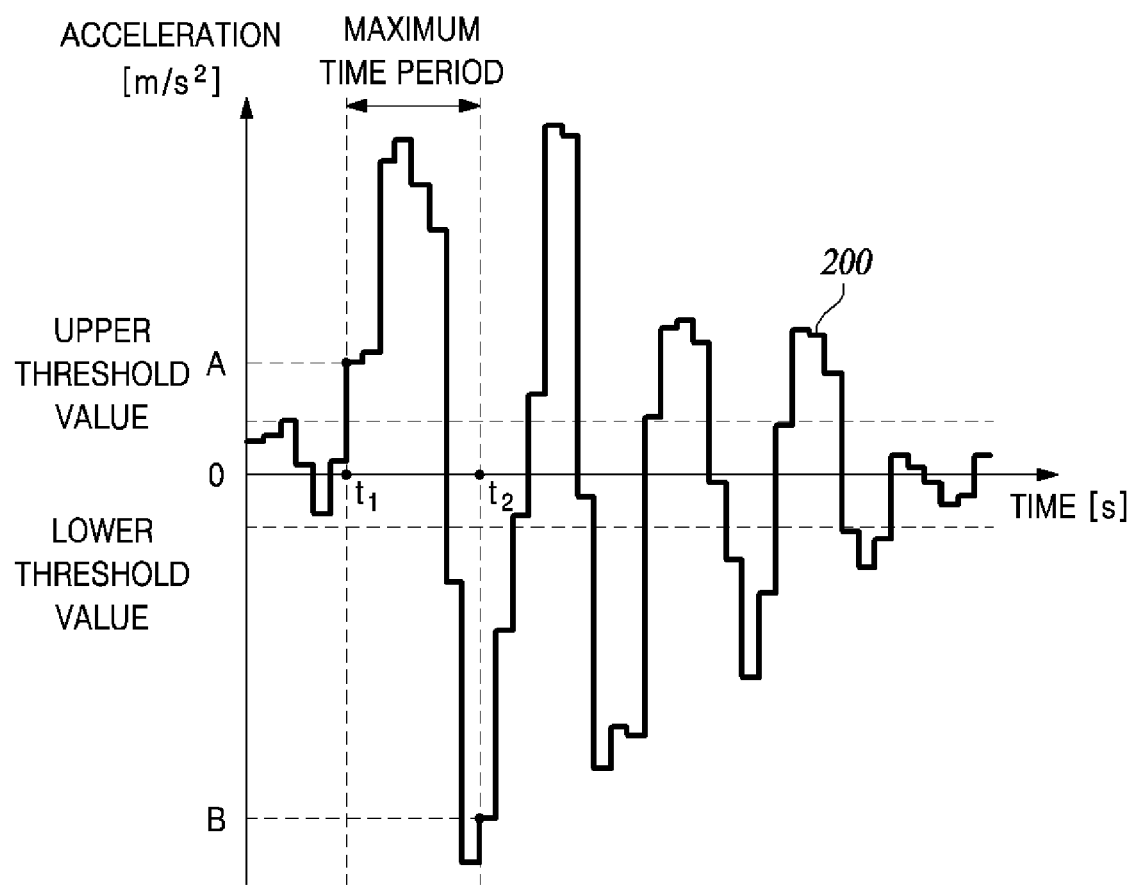
FIGS. 2A and 2B are diagrams for explaining a process of determining a fluctuation in acceleration of a front wheel within a maximum time period according to one embodiment of the present disclosure.
Figure 2B:
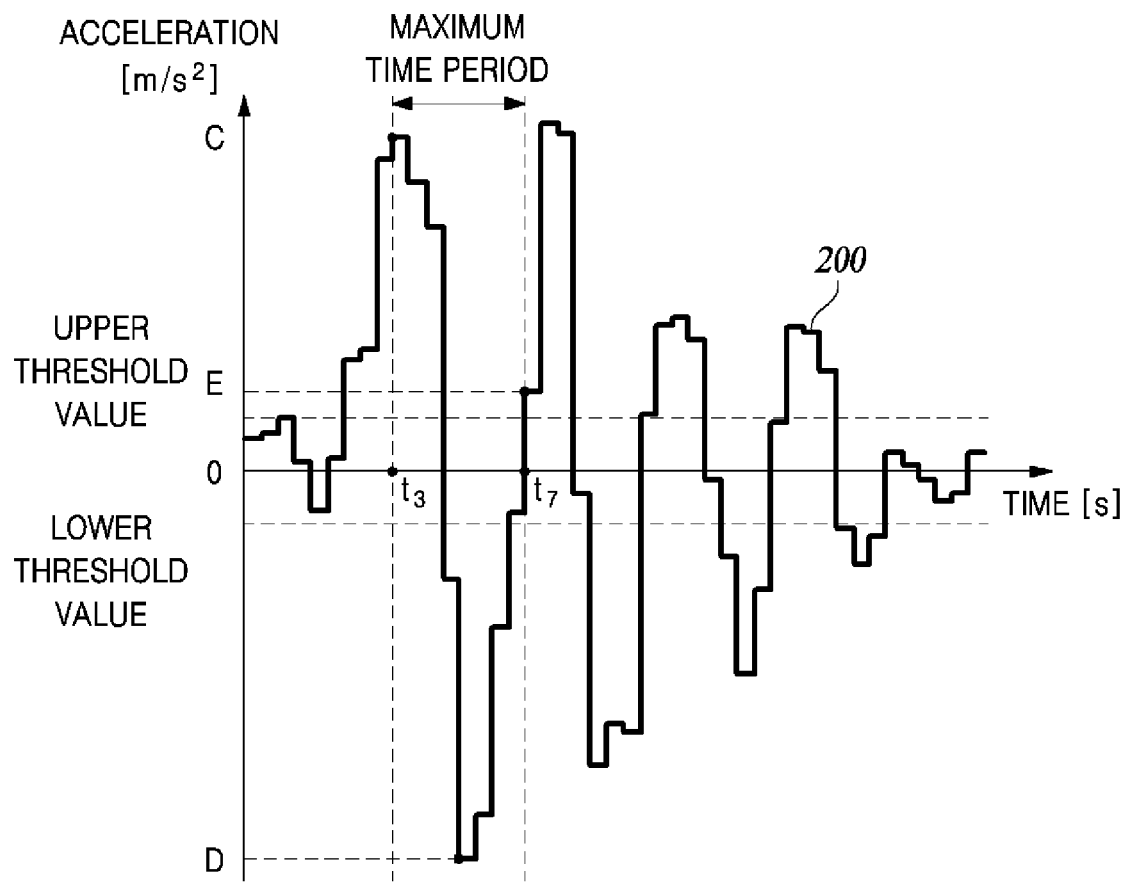

FIGS. 2A and 2B are diagrams for explaining a process of determining the fluctuation in the acceleration of the front wheel within the maximum time period according to one embodiment of the present disclosure.

In FIG. 2A, the control device determines that the acceleration of the front wheel does not fluctuate in the range wider than the acceleration range within the maximum time period.

Referring to FIG. 2A, the acceleration of the front wheel acquired over time is illustrated as a front wheel acceleration graph 200. The acceleration value of the front wheel is described as using a value on the right at the time of calculation, but a value on the left may also be used. The upper threshold value and the lower threshold value are boundary values of a preset acceleration range.

The control device acquires the acceleration of the front wheel every 2 ms, which is a calculation period of the control device.

The control device determines whether the acceleration of the front wheel is outside a preset acceleration range whenever the acceleration of the front wheel is acquired. Since an acceleration A of the front wheel at a time t1 is larger than the upper threshold value, the control device determines that the acceleration of the front wheel deviates from the acceleration range.

The control device monitors the acceleration of the front wheel to determine whether the acceleration of the front wheel fluctuates in the range wider than the acceleration range within the preset maximum time period starting from the time t1 when the acceleration of the front wheel deviates from the acceleration range. Here, a time t2, which is an end point of the maximum time period, may be a time point that has elapsed by 8 ms from the time t1.

Within the maximum time period, the acceleration of the front wheel decreases from a value A larger than the upper threshold value to a value B smaller than the lower threshold value, but the acceleration of the front wheel does not increase from the value smaller than the lower threshold value to the value larger than the upper threshold value after the decrease.

Accordingly, the control device determines that the acceleration of the front wheel does not fluctuate in the range wider than the acceleration range within the maximum time period.

Thereafter, the control device determines whether the accelerations of the front wheel acquired after the time t1 are outside the acceleration range and whether the accelerations fluctuate.

Meanwhile, in FIG. 2B, the control device determines that the acceleration of the front wheel fluctuates in the range wider than the acceleration range within the maximum time period.

Referring to FIG. 2B, an acceleration C of the front wheel is located above the upper threshold value at a time t3.

The control device monitors the acceleration of the front wheel within a maximum time period t7 from the time t3.

Within the time t3 and the time t7, the acceleration of the front wheel decreases from a value of C larger than the upper threshold value to a value of D smaller than the lower threshold value, and then increases from a value of D smaller than the lower threshold value to a value of E larger than the upper threshold value.

At this time, the control device determines that the acceleration of the front wheel fluctuates in the range wider than the acceleration range within the maximum time period.

Figure 3A:
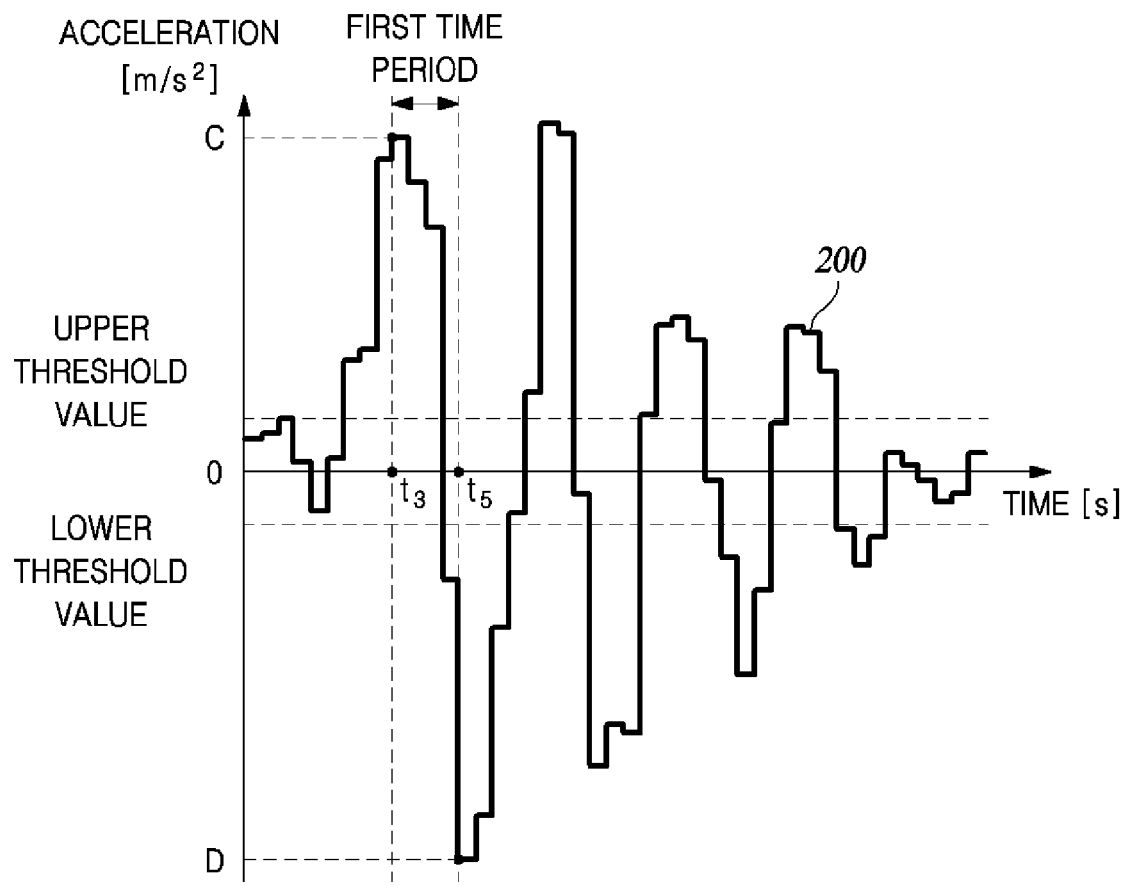
FIGS. 3A, 3B, and 3C are diagrams for explaining a process of determining the fluctuation in the acceleration of the front wheel using a time period having a preset size according to one embodiment of the present disclosure.
Figure 3B:
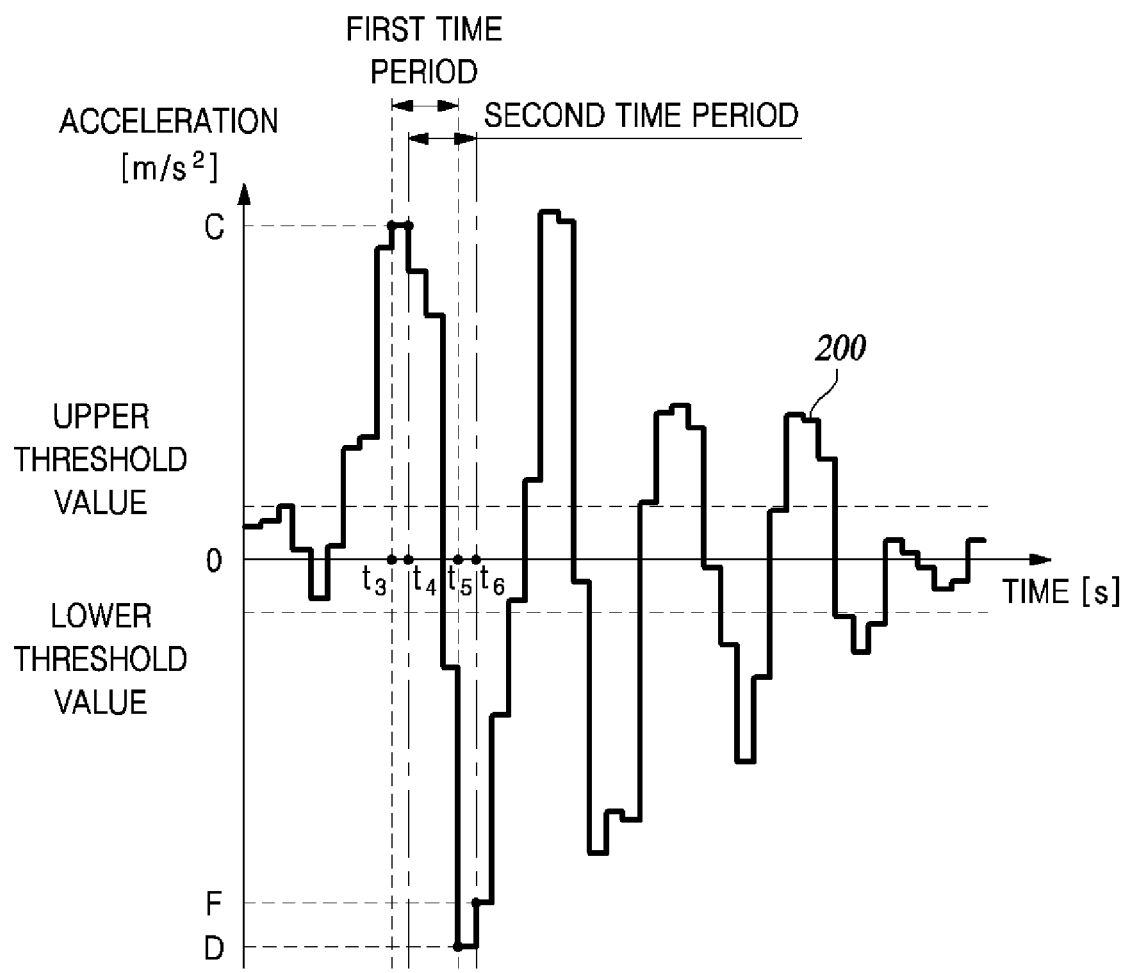
Figure 3C:
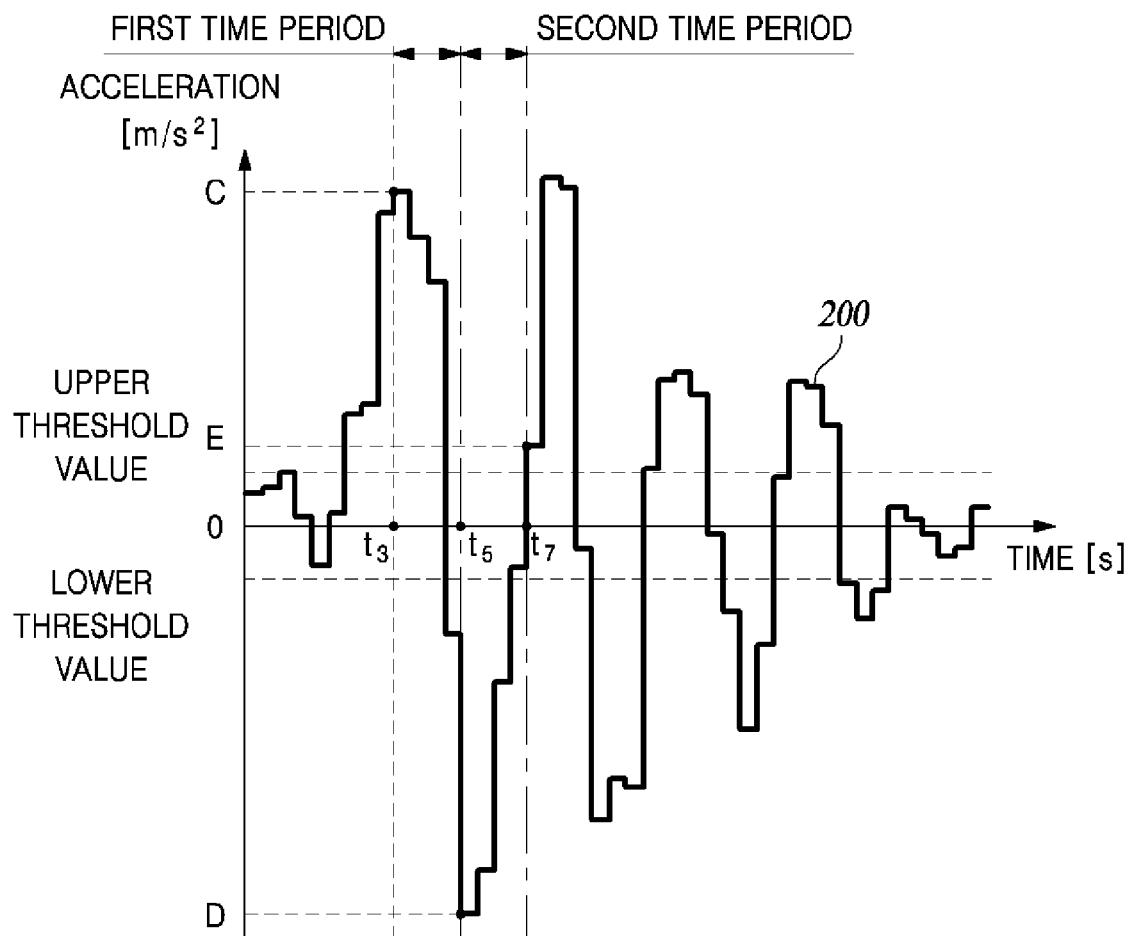

FIGS. 3A, 3B, and 3C are diagrams for explaining a process of determining the fluctuation in the acceleration of the front wheel using a time period having a preset size according to one embodiment of the present disclosure.

Referring to FIG. 3A, the acceleration of the front wheel at the time t3 has the value of C larger than the upper threshold value.

The control device monitors the acceleration of the front wheel to determine whether the acceleration of the front wheel decreases from the value larger than the upper threshold value of the acceleration range to the value smaller than the lower threshold value or increases from the value smaller than the lower threshold value to the value larger than the upper threshold value during the first time period having the preset size. Here, the first time period is a period between the time t3 and the time t5, and has a preset size of 8 ms.

Since the acceleration of the front wheel decreases from the value of C larger than the upper threshold value to the value of D smaller than the lower threshold value during the first time period, the control device determines that the acceleration of the front wheel decreases from the value larger than the upper threshold value of the acceleration range to the value smaller than the lower threshold value during the first time period.

Referring to FIG. 3B, since the acceleration of the front wheel decreases in the range wider than the acceleration range during the first time period, the control device determines whether there is the second time period in which the acceleration of the front wheel increases from the value smaller than the lower threshold value of the acceleration range to the value larger than the upper threshold value. In other words, the control device determines whether the acceleration of the front wheel increases from the value smaller than the lower threshold value of the acceleration range to the value larger than the upper threshold value during the second time period.

Here, the second time period is a time period having a preset size with a starting point within the first time period. The starting point of the second time period may move from the starting point of the first time period to the end point of the first time period. In FIG. 3B, the second time period is a period between a time t4 and a time t6.

In the period between the time t4 and the time t6, the acceleration of the front wheel decreases from the value of C larger than the upper threshold value to the value of F smaller than the lower threshold value. That is, the acceleration of the front wheel does not increase from the value smaller than the lower threshold value to the value larger than the upper threshold value.

Accordingly, the control device determines that the acceleration of the front wheel does not fluctuate in the range wider than the acceleration range during the second time period.

The control device moves the second time period to the right by one operation period, and monitors the acceleration of the front wheel again within the moved second time period.

Referring to FIG. 3C, as the second time period, the acceleration of the front wheel increases from a value of D smaller than the lower threshold value to a value of E larger than the upper threshold value within a period between a time t5 and a time t7. In other words, the acceleration of the front wheel decreases from the value larger than the upper threshold value of the acceleration range to the value smaller than the lower threshold value during the first time period, and the acceleration of the front wheel decreases from the value smaller than the lower threshold value to the value larger than the upper threshold value during the second time period.

At this time, the control device determines that the acceleration of the front wheel fluctuates in the range wider than the acceleration range. Furthermore, the control device determines that the front wheel is passing the bump.

Through the processes described in FIGS. 3A, 3B and 3C, the control device can accurately determine whether the front wheel is passing the bump.

Meanwhile, the control device may apply a determination process corresponding to the process described in FIGS. 3A, 3B and 3C to the rear wheel.

Figure 4:
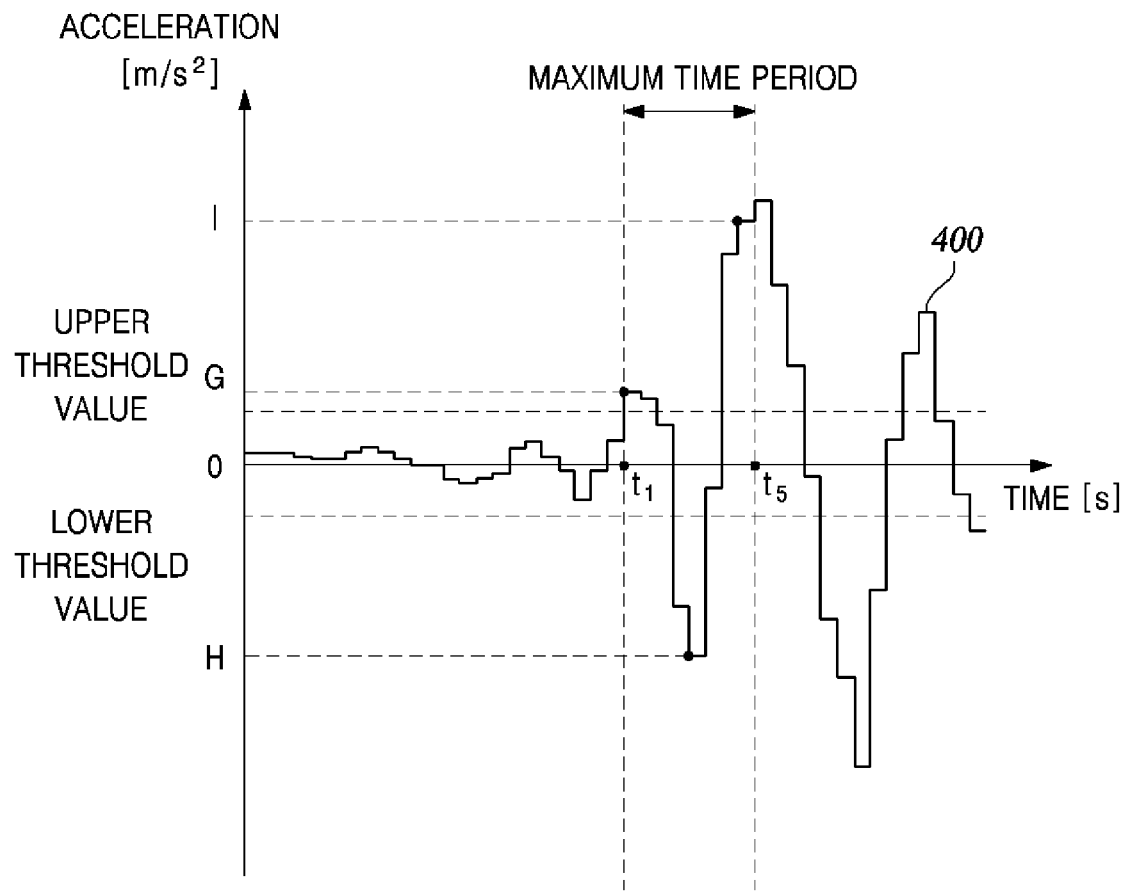
FIG. 4 is a diagram illustrating a process of determining a fluctuation in an acceleration of a rear wheel within a maximum time period according to one embodiment of the present disclosure.

FIG. 4 is a diagram illustrating a process of determining the fluctuation in the acceleration of the rear wheel within the maximum time period according to one embodiment of the present disclosure.

In FIG. 4, the control device determines that the acceleration of the rear wheel fluctuates in the range wider than the acceleration range within the maximum time period.

Referring to FIG. 4, the acceleration of the rear wheel acquired over time is illustrated as a rear wheel acceleration graph 400.

The control device determines whether the acceleration of the rear wheel is outside a preset acceleration range whenever the acceleration of the rear wheel is acquired. Since an acceleration G of the rear wheel is larger than the upper threshold at the time t1, the control device determines that the acceleration of the rear wheel deviates from the acceleration range.

The control device monitors the acceleration of the rear wheel to determine whether the acceleration of the rear wheel fluctuates in the range wider than the acceleration range within a period from the time t1 when the acceleration of the rear wheel deviates from the acceleration range to the preset time t5.

Within the time t1 and the time t5, the acceleration of the rear wheel decreases from a value of G larger than the upper threshold value to a value of H smaller than the lower threshold value, and then increases from the value of H smaller than the lower threshold value to a value of I larger than the upper threshold value.

Accordingly, the control device determines that the acceleration of the rear wheel fluctuates in the range wider than the acceleration range within the maximum time period.

Figure 5A:
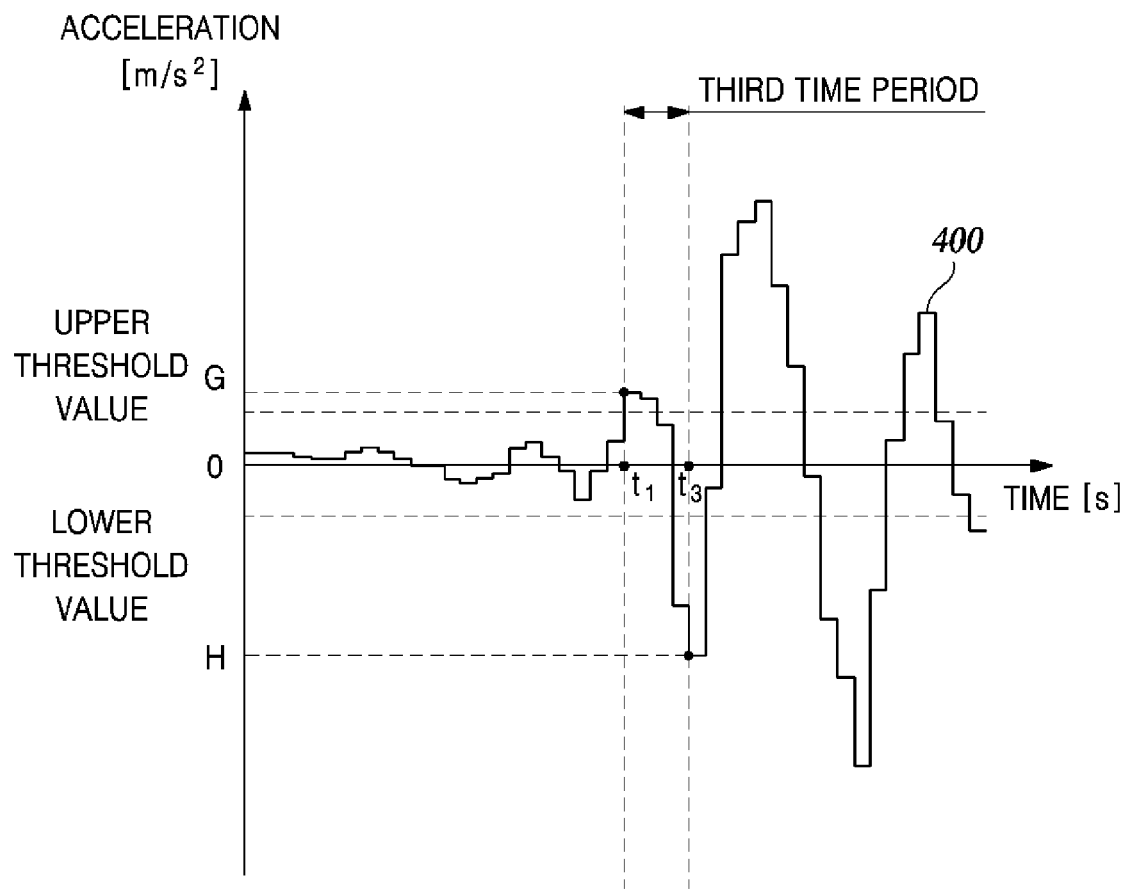
FIGS. 5A and 5B are diagrams for explaining a process of determining the fluctuation in the acceleration of the rear wheel using time periods having a preset size according to one embodiment of the present disclosure.
Figure 5B:
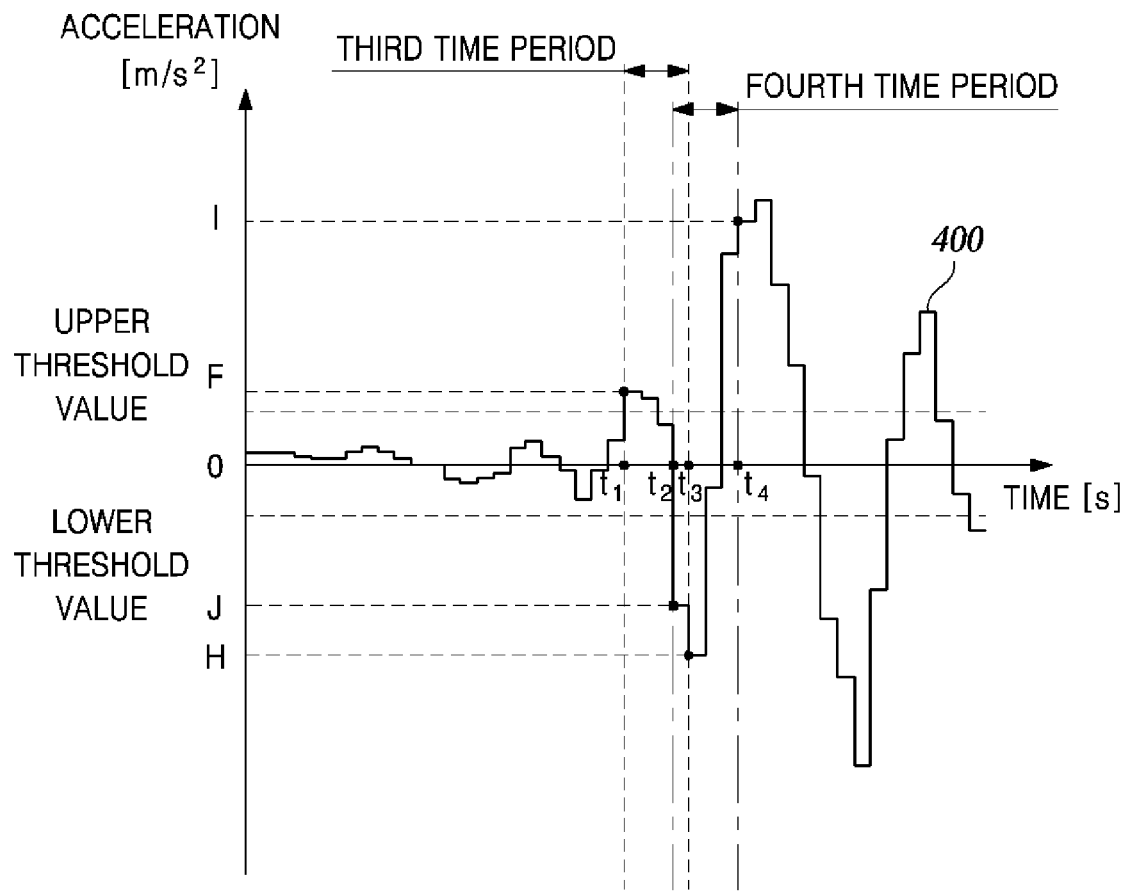

FIGS. 5A and 5B are diagrams for explaining a process of determining the fluctuation in the acceleration of the rear wheel using a time period having a preset size according to one embodiment of the present disclosure.

Referring to FIG. 5A, the acceleration of the rear wheel has the value of G larger than the upper threshold value at the time t1.

The control device monitors the acceleration of the rear wheel to determine whether the acceleration of the rear wheel decreases from the value larger than the upper threshold value of the acceleration range to the value smaller than the lower threshold value during the third time period having the preset size, or whether the acceleration of the rear wheel increases from the value smaller than the lower threshold value to the value larger than the upper threshold value. Here, the third time period is a period between the time t1 and the time t3.

Since the acceleration of the rear wheel decreases from the value of G larger than the upper threshold value to the value of H that is smaller than the lower threshold value during the third time period, the control device determines that the acceleration of the rear wheel decreases from the value larger than the upper threshold value of the acceleration range to the value smaller than the lower threshold value during the third time period.

Referring to FIG. 5B, since the acceleration of the rear wheel decreased in the range wider than the acceleration range during the third time period, the control device determines whether there is the fourth time period in which the acceleration of the rear wheel from the value smaller than the lower threshold value of the acceleration range to the value larger than the upper threshold value. In other words, the control device determines whether the acceleration of the rear wheel increases from the value smaller than the lower threshold value of the acceleration range to the value larger than the upper threshold value during the fourth time period.

Here, the fourth time period is a time period having a preset size with a starting point within the third time period. In FIG. 5B, the fourth time period is a period between the time t2 and the time t4.

During the fourth time period, the acceleration of the rear wheel increases from the value of J smaller than the lower threshold value to the value of I larger than the upper threshold value. In other words, the acceleration of the rear wheel decreases from the value larger than the upper threshold value of the acceleration range to the value smaller than the lower threshold value during the third time period, and the acceleration of the rear wheel increases from the value smaller than the lower threshold value to the value larger than the upper threshold value during the fourth time period.

At this time, the control device determines that the acceleration of the rear wheel fluctuates in the range wider than the acceleration range. Furthermore, the control device determines that the rear wheel is passing the bump.

Through the process described in FIGS. 5A and 5B, the control device can accurately determine whether the rear wheel is passing the bump.

Figure 6:
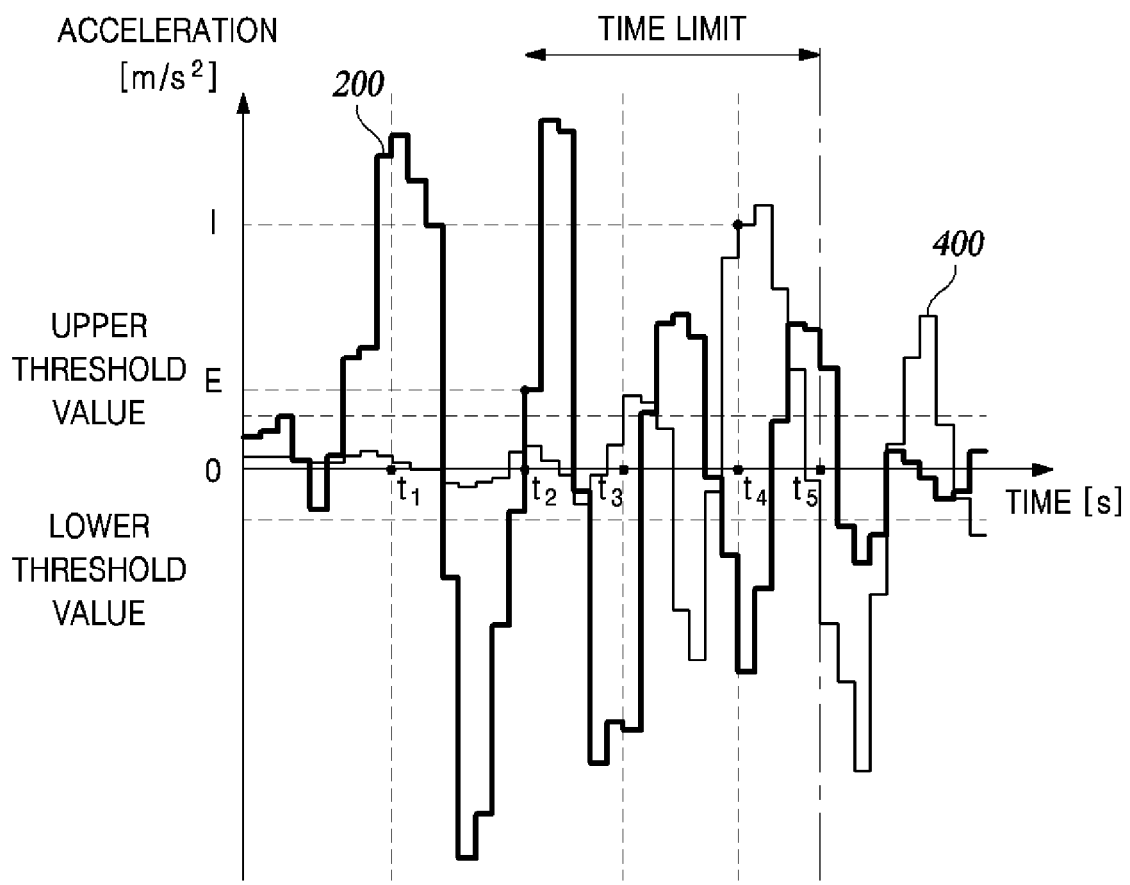
FIG. 6 is a view for explaining control of a drive unit according to a time limit according to one embodiment of the present disclosure.

FIG. 6 is a view for explaining control of a drive unit according to a time limit according to one embodiment of the present disclosure.

Referring to FIG. 6, the front wheel acceleration graph 200 and the rear wheel acceleration graph 400 are illustrated.

The time t1 is the starting point of the first time period, and the time t2 is the end point of the first time period. The time t3 is the starting point of the second time period, and the time t4 is the end point of the second time period.

The control device determines that the front wheel is passing the bump at the time t2. The control device determines that the rear wheel is passing the bump at the time t4.

Furthermore, the control device determines whether the time t4, which is the time point at which it is determined that the rear wheel is passing the bump, is within the time limit from the time point t2 which is the time point at which it is determined that the front wheel is passing the bump. Here, the time limit is a value obtained by dividing the wheelbase length of the vehicle by the traveling speed of the vehicle.

In one embodiment, the control device controls the drive unit only when the time when it is determined that the rear wheel passes the bump is within the time limit from the time when it is determined that the front wheel passes the bump. In FIG. 6, since the time t4 is within the time limit from the time t2, a condition that the control device can control the drive unit is satisfied.

Figure 7A:
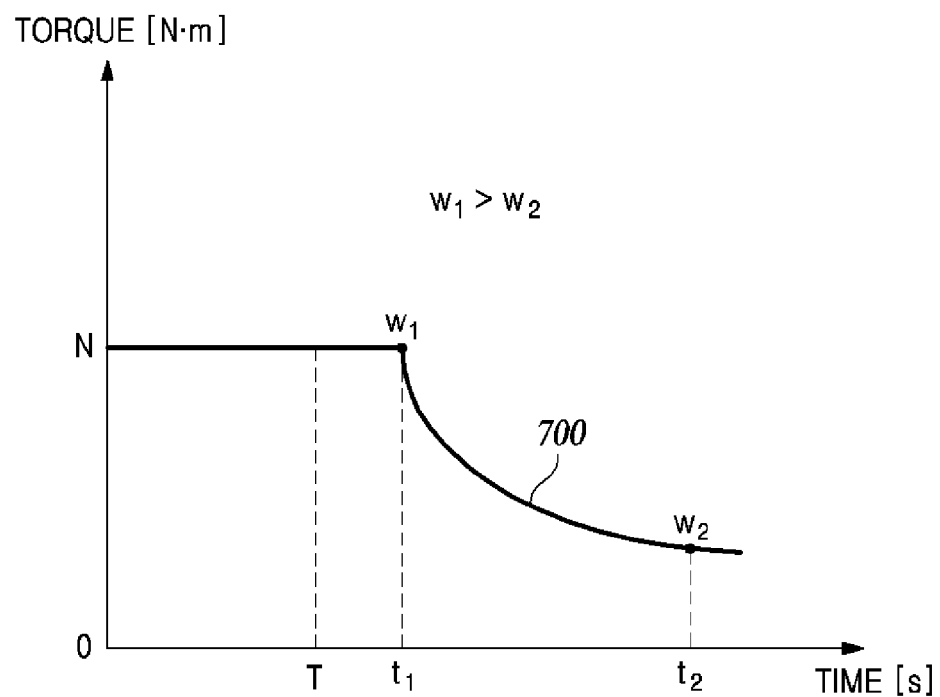
FIGS. 7A and 7B are diagrams for explaining early stopping of a traction control system according to one embodiment of the present disclosure.
Figure 7B:
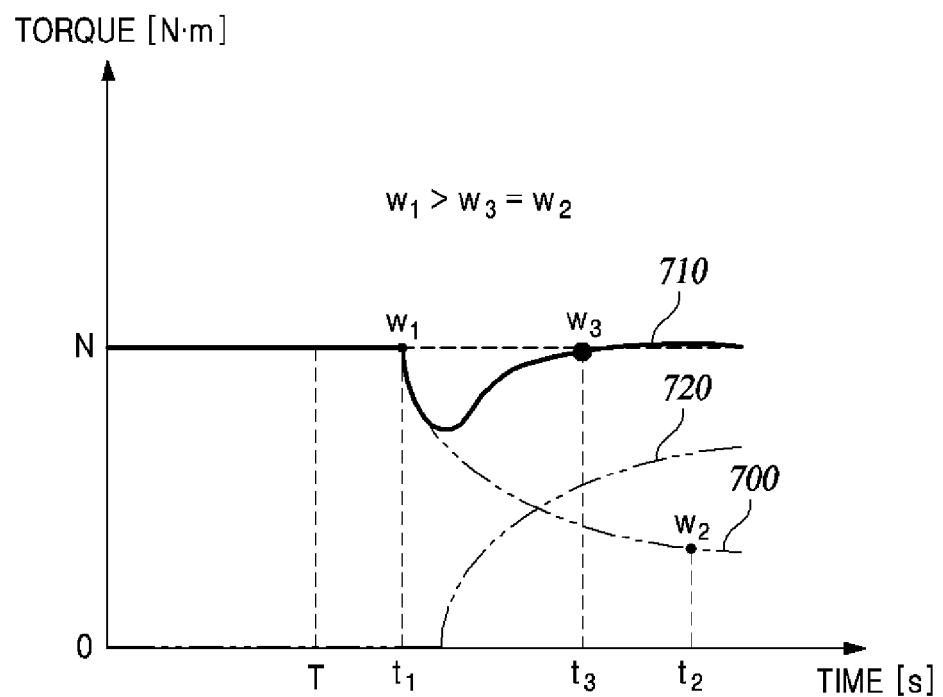

FIGS. 7A and 7B are diagrams for explaining early stopping of the traction control system according to one embodiment of the present disclosure.

Referring to FIG. 7A, a first graph 700 representing the torque of the power source controlled by the traction control system when the vehicle passes the bump is illustrated.

The drive wheel of the vehicle collides with the bump at a time T.

From the time T, the slip ratio of the drive wheel increases.

At the time t1, the traction control system starts to operate. From the time t1, the torque of the power source is reduced by the traction control system. The slip ratio of the drive wheel at the time t1 is w1.

When the slip ratio of the drive wheel decreases to a preset value w2, the operation of the traction control system is stopped.

Since the torque of the power source and the slip ratio of the drive wheel are reduced at the bump by the traction control system, the starting or accelerating performance of the vehicle is deteriorated.

Referring to FIG. 7B, the first graph 700, a second graph 710, and a third graph 720 are illustrated.

The second graph 710 illustrates the torque of the power source based on the control of the traction control system and the control of the control device.

The third graph 720 exemplarily illustrates an amount of control generated by the control device with respect to the torque of the power source according to one embodiment of the present disclosure. The control device can be operated to compensate for the torque that is controlled by the traction control system.

Meanwhile, when the road surface is slippery, the higher the torque of the power source, the slower the slip ratio of the drive wheel decreases. However, when the road surface is not slippery, the higher the torque of the power source, the faster the slip ratio of the drive wheel may decrease. That is, as the slip ratio of the drive wheel quickly reaches a target slip ratio targeted by the traction control system, the traction control system can be terminated early.

In order to prematurely stop the operation of the traction control system on the non-slippery bump, the control device controls the drive unit to increase the torque of the power source. Specifically, the control device stores a torque N of the power source at the time t1, which is the time when the traction control system operates. Thereafter, when the front wheel and the rear wheel pass the bump, the control device controls the drive unit based on a difference between the torque of the power source and the pre-stored torque value N. In other words, the control device controls the drive unit so that the torque of the power source follows the pre-stored torque N.

Unlike the first graph 700, the second graph 710 decreases for a predetermined time from the time t1 and then increases again under the control of the control device.

The time to reach the target slip ratio is shorter in the second graph 710 according to the control of the control device than in the first graph 700 according to the traction control system. Specifically, when only the traction control system operates, the slip ratio of the drive wheel reaches a target slip ratio w2 at the time t2. Meanwhile, under the control of the control device, the slip ratio of the drive wheel reaches a target slip ratio w3 at a time t3 earlier than the time t2. Here, w2 and w3 are the same value.

In this way, the control device can improve the acceleration performance and the starting performance of the vehicle by terminating the traction control system early on the bump with a non-slippery surface and maintaining the torque of the power source high.

Figure 8:
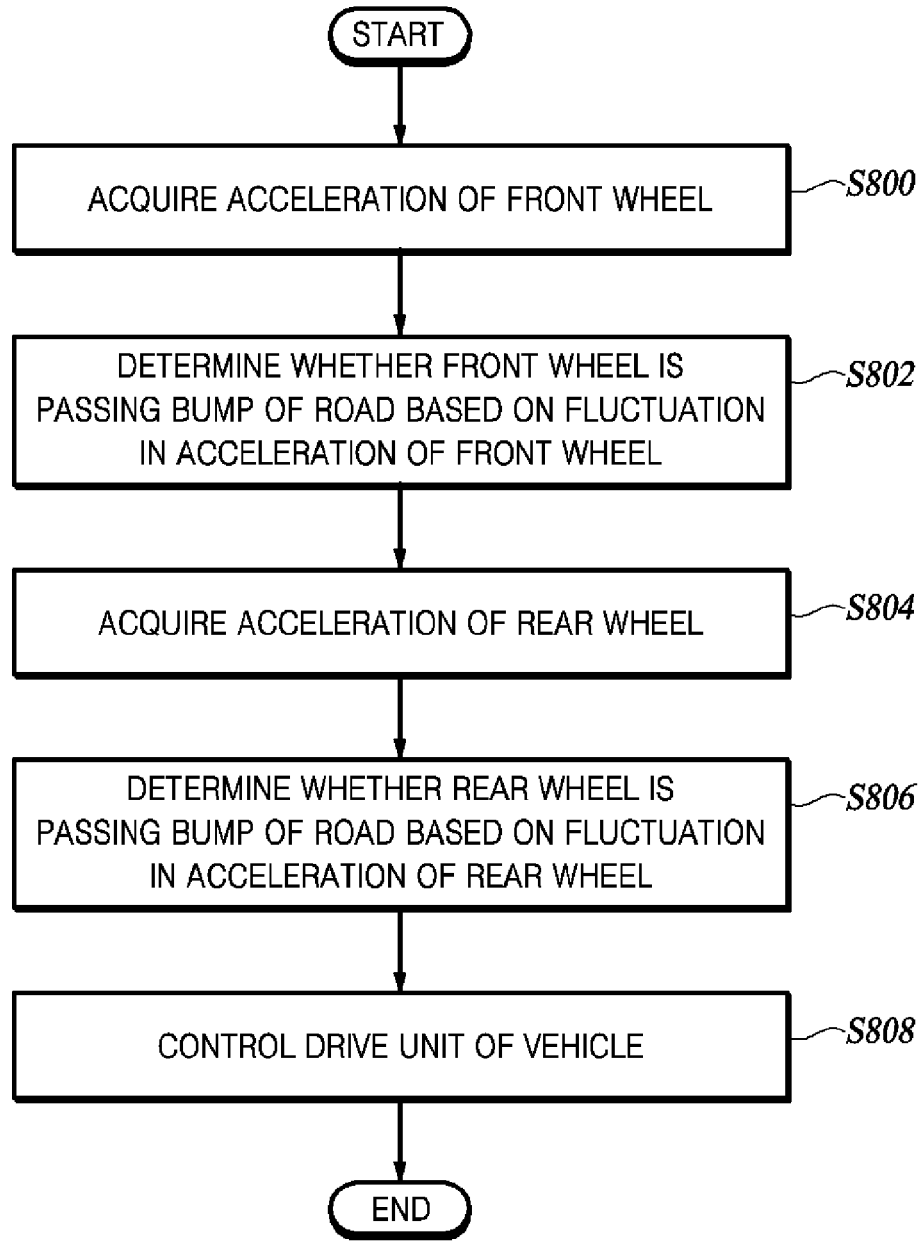
FIG. 8 is a flowchart illustrating a method of operating a control device according to one embodiment of the present disclosure.

FIG. 8 is a flowchart illustrating a method of operating the control device according to one embodiment of the present disclosure.

Referring to FIG. 8, the control device acquires the acceleration of the front wheel (S800).

The control device determines whether the front wheel is passing the bump of the road based on the fluctuation in the acceleration of the front wheel (S802).

Specifically, the control device determines that the front wheel is passing the bump of the road when the acceleration of the front wheel is outside the preset acceleration range and the acceleration of the front wheel fluctuates in the range wider than the acceleration range within the preset maximum time period from the time when the acceleration of the front wheel deviates from the acceleration range.

The control device acquires the acceleration of the rear wheel (S804).

Specifically, the control device determines that the rear wheel is passing the bump when the acceleration of the rear wheel is outside the acceleration range and the acceleration of the rear wheel fluctuates in the range wider than the acceleration range within the preset maximum time period from the time when the acceleration of the rear wheel deviates from the acceleration range.

Thereafter, the control device controls the drive unit of the vehicle (S808).

In particular, when it is determined that the front wheel passed the bump and the rear wheel is passing the bump, the control device controls the drive unit of the vehicle.

In one embodiment, the control device controls the drive unit based on the difference between the output of the power source of the vehicle and the preset value. Here, the preset value is an output value of the power source when the traction control system starts to operate.

In one embodiment, the control device controls the drive unit in a case where the time when it is determined that the rear wheel passes the bump is within the time limit from the time when it is determined that the front wheel passes the bump. Here, the time limit is a value calculated based on the wheelbase and the speed of the vehicle.

In one embodiment, the control device controls the drive unit when the speed of the drive wheel of the vehicle is smaller than a value corresponding to the operation condition of the traction control system.

In one embodiment, the control device controls the drive unit based on the control authority received from the occupant through the user interface.

Figure 9:
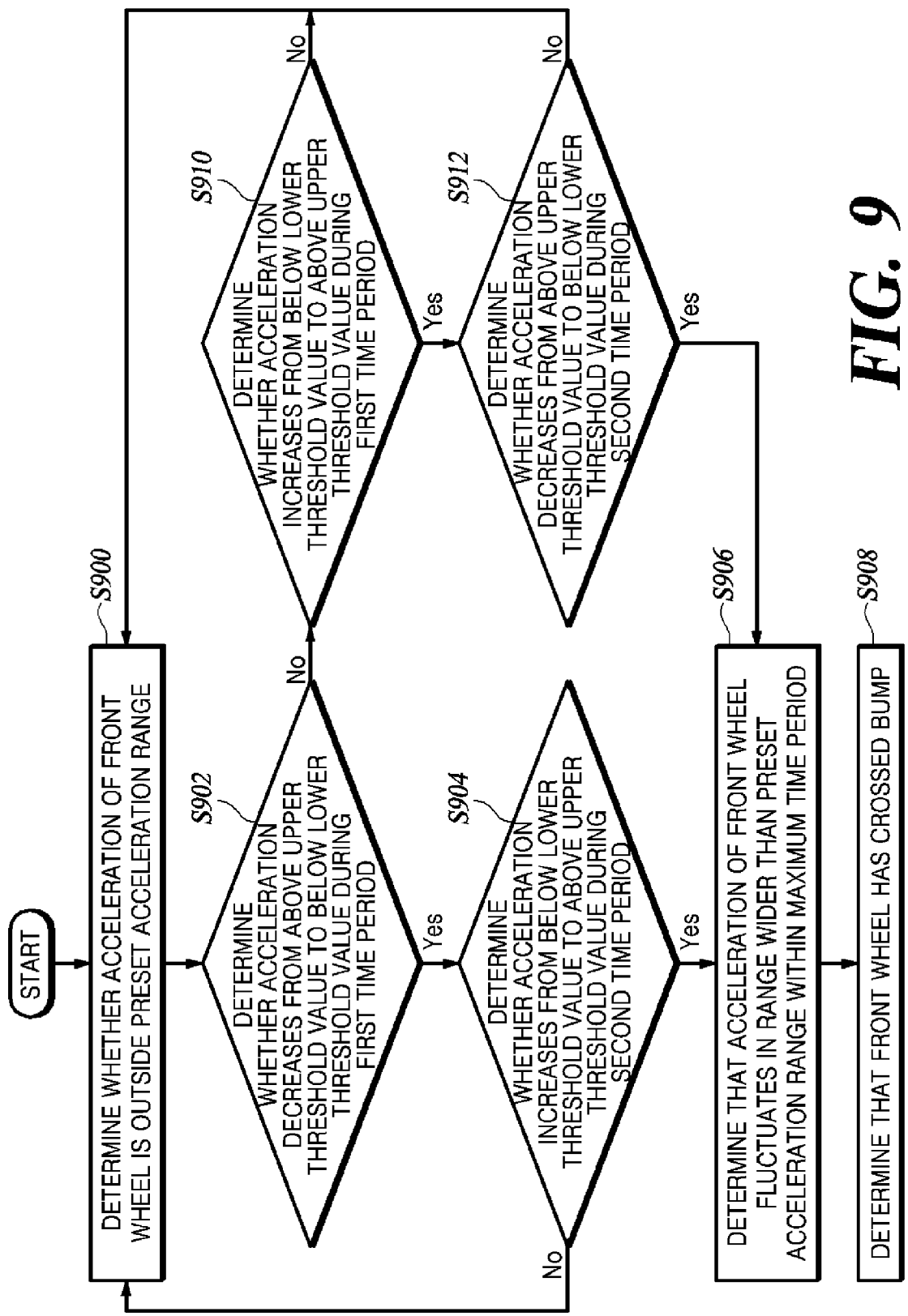
FIG. 9 is a flowchart illustrating a process of determining whether the front wheel passes the bump according to one embodiment of the present disclosure.

FIG. 9 is a flowchart illustrating a process of determining that the front wheel is passing the bump according to one embodiment of the present disclosure.

The control device determines whether the acceleration of the front wheel is outside the preset acceleration range (S900).

The control device determines whether the acceleration decreases from above the upper threshold value to below the lower threshold value during the first time period (S902).

When the acceleration decreases from above the upper threshold value to below the lower threshold value during the first time period, the control unit determines whether the acceleration increases from below the lower threshold value to above the upper threshold value during the second time period (S904).

When the acceleration increases from below the lower threshold value to above the upper threshold value during the second time period, the control device determines that the acceleration of the front wheel fluctuates in the range wider than the preset acceleration range within the maximum time period (S906).

When it is determined that the acceleration of the front wheel fluctuates in the range wider than the preset acceleration range within the maximum time period, the control device determines that the front wheel is passing the bump of the road (S908).

Meanwhile, when the acceleration does not decrease from above the upper threshold value to below the lower threshold value during the first time period, the control device determines whether the acceleration increases from below the lower threshold value to above the upper threshold value during the first time period (S910).

When the acceleration increases from below the lower threshold value to above the upper threshold value during the first time period, the control device determines whether the acceleration decreases from above the upper threshold value to below the lower threshold value during the second time period (S912).

When the acceleration decreases from above the upper threshold value to below the lower threshold value during the second time period, the control device performs Steps S906 and S908.

Otherwise, the control device returns to Step S900 and repeats the same procedure for the next acceleration value.

According to one embodiment, the method and apparatus for controlling the vehicle can prevent the acceleration performance or the starting performance of the vehicle from being degraded by the traction control system when the vehicle travels a bump of a road.

According to one embodiment, the method and apparatus for controlling a vehicle can accurately determine whether a front wheel and a rear wheel have crossed the bump of the road.

According to one embodiment, the method and apparatus for controlling a vehicle can maintain the traction control performance of the traction control system by taking into consideration a speed of a drive wheel and not controlling the vehicle on a bump with a slippery surface.

Various implementations of the systems and techniques described herein can be realized by a digital electronic circuit, an integrated circuit, a field programmable gate array (FPGA), an application specific integrated circuit (ASIC), computer hardware, a firmware, software, and/or a combination thereof. These various implementations may include being implemented in one or more computer programs executable on a programmable system. The programmable system includes at least one programmable processor (which may be a special purpose processor or may be a general-purpose processor) coupled to receive data and instructions from, and transmit data and instructions to, a storage system, at least one input device, and at least one output device. Computer programs (also known as programs, software, software applications or code) contain instructions for a programmable processor and are stored on a "computer-readable medium."

The computer-readable recording medium includes all types of recording devices in which data readable by a computer system is stored. The computer-readable recording medium may be non-volatile or non-transitory medium, such as a ROM, a CD-ROM, a magnetic tape, a floppy disk, a memory card, a hard disk, a magneto-optical disk, and a storage device, and may further include a transitory medium such as a data transmission medium. In addition, the computer-readable recording medium may be distributed in a network-connected computer system, and the computer-readable code may be stored and executed in a distributed manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although it is described that each process is sequentially executed in the flowchart/timing diagram of the present specification, this is merely illustrative of the technical idea of one embodiment of the present disclosure. In other words, one of ordinary skill in the art to which one embodiment of the present disclosure may change the order described in the flowchart/timing diagram within a range that does not deviate from the essential characteristics of one embodiment of the present disclosure, or can apply various modifications and variations by executing one or more of the processes in parallel, and the flowchart/timing diagram is not limited to a time-series order.

What is claimed is:

1. A method of operating a vehicle control device, the method comprising:
    acquiring an acceleration of a front wheel of a vehicle;
    determining (1) whether the acceleration of the front wheel is outside an acceleration range and (2) whether the acceleration of the front wheel fluctuates in a range wider than the acceleration range within a first maximum time period starting from a time at which the acceleration of the front wheel departs from the acceleration range;
    determining that the front wheel is passing a bump of a road in response to determining that (1) the acceleration of the front wheel is outside the acceleration range and (2) the acceleration of the front wheel fluctuates in the range wider than the acceleration range within the first maximum time period;
    acquiring an acceleration of a rear wheel of the vehicle;
    determining (1) whether the acceleration of the rear wheel is outside the acceleration range and (2) whether the acceleration of the rear wheel fluctuates in a range wider than the acceleration range within a second maximum time period starting from a time at which the acceleration of the rear wheel departs from the acceleration range;
    determining that the rear wheel is passing the bump in response to determining that (1) the acceleration of the rear wheel is outside the acceleration range and (2) the acceleration of the rear wheel fluctuates in the range wider than the acceleration range within the second maximum time period; and
    in response to determining that the front wheel has passed the bump and the rear wheel is passing the bump, controlling a drive unit of the vehicle to control a power source of the vehicle,
    wherein controlling the drive unit includes restraining an output of the power source of the vehicle from being reduced.

2. The method of claim 1, wherein determining that the acceleration of the front wheel fluctuates in the range wider than the acceleration range includes determining that (1) the acceleration of the front wheel decreases from a first value larger than an upper threshold value of the acceleration range to a second value smaller than a lower threshold value during a first time period, and (2) the acceleration of the front wheel increases from a third value smaller than the lower threshold value to a fourth value larger than the upper threshold value during a second time period having a starting point within the first time period.

3. The method of claim 1, wherein determining that the acceleration of the front wheel fluctuates in the range wider than the acceleration range includes determining that (1) the acceleration of the front wheel increases from a first value smaller than an lower threshold value of the acceleration range to a second value larger than an upper threshold value of the acceleration range during a first time period, and (2) the acceleration of the front wheel decreases from a third value larger than the upper threshold value to a fourth value smaller than the lower threshold value during a second time period having a starting point within the first time period.

4. The method of claim 1, wherein determining that the acceleration of the rear wheel fluctuates in the range wider than the acceleration range includes determining that (1) the acceleration of the rear wheel decreases from a first value larger than an upper threshold value of the acceleration range to a second value smaller than a lower threshold value of the acceleration range during a first time period, and (2) the acceleration of the rear wheel increases from a third value smaller than the lower threshold value to a fourth value larger than the upper threshold value during a second time period having a starting point within the first time period.

5. The method of claim 1, wherein determining that the acceleration of the rear wheel fluctuates in the range wider than the acceleration range includes determining that (1) the acceleration of the rear wheel increases from a first value smaller than an lower threshold value of the acceleration range to a second value larger than an upper threshold value of the acceleration range during a first time period, and (2) the acceleration of the rear wheel decreases from a third value larger than the upper threshold value to an fourth value smaller than the lower threshold value during a second time period having a starting point within the first time period.

6. The method of claim 1, wherein controlling the drive unit includes controlling the drive unit based on a difference between the output of the power source and a preset value corresponding to an output value of the power source when a traction control system of the vehicle starts to operate.

7. The method of claim 1, wherein controlling the drive unit includes controlling the drive unit when a first time at which the rear wheel is determined to be passing the bump is within a time limit from a second time at which the front wheel is determined to be passing the bump, the time limit being determined based on a wheelbase and a speed of the vehicle.

8. The method of claim 1, wherein controlling the drive unit of the vehicle comprises controlling the drive unit when a speed of a drive wheel of the vehicle is smaller than a value corresponding to an operation condition of a traction control system of the vehicle.

9. The method of claim 1, wherein controlling the drive unit comprises controlling the drive unit based on a control authority received from an occupant through a user interface of the vehicle.

10. A device for controlling a vehicle, comprising:
an acquirement unit configured to acquire accelerations of front and rear wheels of the vehicle;
a determination unit configured to:
determine whether (1) the acceleration of the front wheel is outside an acceleration range and (2) the acceleration of the front wheel fluctuates in a range wider than the acceleration range within a first maximum time period starting from a time at which the acceleration of the front wheel departs from the acceleration range;
determine that the front wheel is passing a bump of a road in response to determining that (1) the acceleration of the front wheel is outside the acceleration range and (2) the acceleration of the front wheel fluctuates in the range wider than the acceleration range within the first maximum time period; and
determine whether (1) the acceleration of the rear wheel is outside the acceleration range and (2) the acceleration of the rear wheel fluctuates in a range wider than the acceleration range within a second maximum time period starting from a time at which the acceleration of the rear wheel departs from the acceleration range; and
determine that the rear wheel is passing the bump in response to determining that (1) the acceleration of the rear wheel is outside the acceleration range and (2) the acceleration of the rear wheel fluctuates in the range wider than the acceleration range within the second maximum time period; and
a control unit configured to control, in response to the determination unit determining that the front wheel has passed the bump and the rear wheel is passing the bump, a drive unit of the vehicle to control a power source of the vehicle,
wherein, to control the power source of the vehicle, the control unit is configured to restrain an output of the power source of the vehicle from being reduced.

11. The device of claim 10, wherein the determination unit is configured to determine that the acceleration of the front wheel fluctuates in the range wider than the acceleration range in response to determining that (1) the acceleration of the front wheel decreases from a first value larger than an upper threshold value of the acceleration range to a second value smaller than a lower threshold value of the acceleration range during a first time period, and (2) the acceleration of the front wheel increases from a third value smaller than a lower threshold value of the acceleration range to a fourth value larger than the upper threshold value during a second time period having a starting point within the first time period.

12. The device of claim 10, wherein the determination unit is configured to determine that the acceleration of the front wheel fluctuates in the range wider than the acceleration range in response to determining that (1) the acceleration of the front wheel increases from a first value smaller than a lower threshold value of the acceleration range to a second value larger than an upper threshold value of the acceleration range during a first time period and (2) the acceleration of the front wheel decreases from a third value larger than the upper threshold value to a fourth value smaller than the lower threshold value during a second time period having a starting point within the first time period.

13. The device of claim 10, wherein the determination unit is configured to determine that the acceleration of the rear wheel fluctuates in the range wider than the acceleration range in response to determining that (1) the acceleration of the rear wheel decreases from a first value larger than an upper threshold value of the acceleration range to a second value smaller than a lower threshold value of the acceleration range during a first time period and (b) the acceleration of the rear wheel increases from a third value smaller than the lower threshold value to a fourth value larger than the upper threshold value during a second time period having a starting point within the first time period.

14. The device of claim 10, wherein the determination unit is configured to determine that the acceleration of the rear wheel fluctuates in the range wider than the acceleration range in response to determining that (1) the acceleration of the rear wheel increases from a first value smaller than a lower threshold value of the acceleration range to a second value larger than an upper threshold value of the acceleration range during a first time period and (2) the acceleration of the rear wheel decreases from a third value larger than the upper threshold value to a fourth value smaller than the lower threshold value during a second time period having a starting point within the first time period.

15. The device of claim 10, wherein the control unit is configured to control the drive unit based on a difference between the output of the power source and a preset value corresponding to an output value of the power source when a traction control system starts to operate.

16. The device of claim 10, further comprising a calculation unit configured to calculate a time limit based on a wheelbase and a speed of the vehicle,
wherein the control unit is configured to control the drive unit when a first time at which the rear wheel is determined to be passing the bump is within the time limit from a time at which the front wheel is determined to be passing the bump.

17. The device of claim 10, wherein the control unit is configured to control the drive unit when a speed of a drive wheel of the vehicle is smaller than a value corresponding to an operation condition of a traction control system of the vehicle.

18. The device of claim 10, wherein the control unit is configured to control the drive unit based on a control authority received from an occupant through a user interface of the vehicle.

* * * * *